US012768493B2

(12) United States Patent
McEndree et al.

(10) Patent No.: US 12,768,493 B2
(45) Date of Patent: Oct. 20, 2026

(54) GIMBAL KNOB ASSEMBLIES FOR CLAMPING ON NON-PARALLEL SURFACES

(71) Applicant: Blue Origin Manufacturing, LLC, Huntsville, AL (US)

(72) Inventors: Caryl McEndree, Cocoa, FL (US); Michael Richards, Titusville, FL (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 268 days.

(21) Appl. No.: 18/660,029

(22) Filed: May 9, 2024

(65) Prior Publication Data

US 2025/0347383 A1 Nov. 13, 2025

(51) Int. Cl.
*F16M 13/02* (2006.01)

(52) U.S. Cl.
CPC .................................. *F16M 13/02* (2013.01)

(58) Field of Classification Search
CPC .... F16M 13/02; F16M 13/022; F16M 11/041; F16M 11/2078; F16M 11/2085; F16M 11/14
See application file for complete search history.

(56) References Cited

FOREIGN PATENT DOCUMENTS

TW M399780 U * 3/2011

* cited by examiner

*Primary Examiner* — Jason L Vaughan
*Assistant Examiner* — Amanda Kreiling
(74) *Attorney, Agent, or Firm* — Hogan Lovells Cadwalader US LLP

(57) ABSTRACT

Systems and methods are directed toward clamping assemblies that can be used to at least temporarily secure an object to a surfacer in a non-parallel arrangement. In at least one embodiment, a gimbal knob can be used that includes a gimbal joint able to receive a connecting bolt over a range of angles with respect to an axis of rotation of the gimbal knob. As the gimbal knob is rotated, the gimbal joint can pivot to receive the connecting bolt, and the connecting bolt can be pulled into a threaded receptacle of the gimbal joint. The gimbal knob can use a number of bearings to allow for pivoting of the threaded receptacle as necessary. Multiple gimbal knobs can be used to secure an object to a curved, irregular, or non-planar surface or other object.

20 Claims, 10 Drawing Sheets

GIMBAL KNOB ASSEMBLIES FOR CLAMPING ON NON-PARALLEL SURFACES

TECHNICAL FIELD

Developments disclosed and suggested herein relate generally to adjustable mechanisms for securing devices in place, and particularly to a gimbal knob assembly that includes a gimbal joint, for receiving a securement bolt, and a hand tightening knob to allow for tightening along an axis that is different from a primary direction of securement of the bolt.

BACKGROUND

Various physical components require the ability to be secured in place, at least temporarily, during a manufacture or installation process. For example, a drill jig may need to be connected to the interior of a tank in order to install one or more doubler plates to a weld seam, where precise holes are required to be drilled for the doubler (or tripler) fasteners. One approach to securely and stably mounting the drill jig would be to removably attach at least one crossbeam to an interior surface of the tank, and then use the crossbeam to mount the drill jig. Unfortunately, the crossbeam will be relatively planar while the interior of the tank is curved, such that a standard clamping mechanism could either have its primary axis of securement orthogonal to the local surface of the tank interior or orthogonal to the plane of the crossbar, but not both. The resulting angle between the primary axis of securement and either the crossbar or local tank interior can prevent use of a conventional clamping mechanism that requires both of these surfaces to be orthogonal to the primary axis of tightening or securement. While mechanisms exist that can be used with angled surfaces, these mechanisms generally do not allow for the use of a threaded shaft (or similar tightening mechanism) along the securement direction.

SUMMARY

Disclosed herein are clamping assemblies and approaches that are able to be used for non-parallel arrangements of objects to be clamped together. In particular, a gimbal knob can be used in various embodiments that can be used with a clamp mount attached to a surface that is at an angle with respect to a surface of an object to be secured. A clamp mount can include a connecting bolt (or other such connection mechanism) that is positioned along a surface normal at an attachment point. A threaded receptacle of the gimbal knob can be positioned to receive the threaded connection bolt. The gimbal knob can be rotated to cause the threaded connection bolt to be pulled into the threaded receptacle. Due to the orientation, the connecting bolt may be at an angle with respect to the axis of rotation of the gimbal knob. To account for the bolt being positioned over a potential angular range, the threaded receptacle can be positioned in, or associated with, a gimbal joint that is able to pivot with respect to the axis of rotation of the gimbal knob. The ability for the gimbal joint to pivot enables the gimbal knob to be rotated along an axis of rotation, while causing the direction of motion (and thus clamping) of the gimbal knob to be at an angle with respect to that axis. Such an approach allows the gimbal knob to be used to clamp objects to angled surfaces while still providing secure and stable clamping of the object.

Various embodiments may include configurations where a clamping assembly includes a clamp mount and a gimbal knob. The clamp mount can include an attachment mechanism to provide secure attachment of the clamp mount to a mounting surface, as well as a threaded bolt extending in a direction orthogonal to the mounting surface. The gimbal knob can include a turnable knob portion and a knob bottom. The gimbal knob can also include a gimbal joint having a threaded receptacle for receiving the threaded bolt of the clamp mount. The gimbal joint can have a plurality of ball bearings positioned around a circumference of the gimbal joint that are able to be received by inner recesses of the turnable knob portion. This can allow the gimbal joint to pivot with respect to an axis of rotation of the gimbal knob but prevent independent rotation of the gimbal joint within the gimbal knob. An object to be clamped to the mounting surface can have the threaded bolt inserted through an opening in the object that is received by the threaded receptacle of the gimbal knob. The gimbal joint is able to pivot to receive the threaded bolt at an angle with respect to the axis of rotation. The object is able to be clamped to the mounting surface in response to the gimbal knob being rotated in a tightening direction, which causes the threaded bolt to be drawn into the threaded receptacle of the gimbal knob. The knob bottom is brought into secure contact with the object in an orientation that is at an angle with respect to the mounting surface.

Various embodiments may include gimbal knobs that each include a knob housing and a gimbal joint. The gimbal joint can be positioned within a cavity of the knob housing. The gimbal joint can pivot with respect to an axis of rotation of the gimbal knob to allow a threaded receptacle of the gimbal joint to receive a threaded connecting shaft. The threaded connecting shaft can be received at an angle with respect to the axis of rotation. The threaded connecting shaft is able to be drawn into the threaded housing at the angle during rotation of the gimbal knob, such that an object positioned between the knob housing and a clamp mount, corresponding to the threaded connecting shaft, is able to be clamped in place with respect to an angled mounting surface.

Various embodiments allow for clamping of an object to be performed using a clamping assembly. In at least one embodiment, a threaded connection bolt, of a clamp mount, is received to a threaded receptacle of a gimbal knob. The threaded receptacle corresponds to a gimbal joint able to pivot with respect to an axis of rotation of the gimbal knob. An initial rotation of the gimbal knob is performed along the axis of rotation. This can cause the gimbal joint to pivot to an angle allowing the threaded connection bolt to begin to be received into the threaded receptacle. Additional rotation of the gimbal knob can be performed along the axis of rotation to cause the threaded connection bolt to be drawn further into the threaded receptacle. This can cause the gimbal knob to be brought into contact with an object positioned between the clamp mount and the gimbal knob. The gimbal knob is moved into contact with the object in a direction corresponding to the angle. A bottom surface of the gimbal knob can then securely contact a surface of the object that is non-parallel to a mounting surface to which the clamp mount is attached. The pressure or force applied can result in a secure clamping of the object to the mounting surface.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure. As noted above, the drawings as depicted are not necessarily drawn to scale. The relative dimensions and proportions as shown are not intended to limit the present disclosure, unless indicated otherwise. Various embodiments in accordance with the present disclosure will be described with reference to the drawings, in which:

DETAILED DESCRIPTION

Figure 1A:
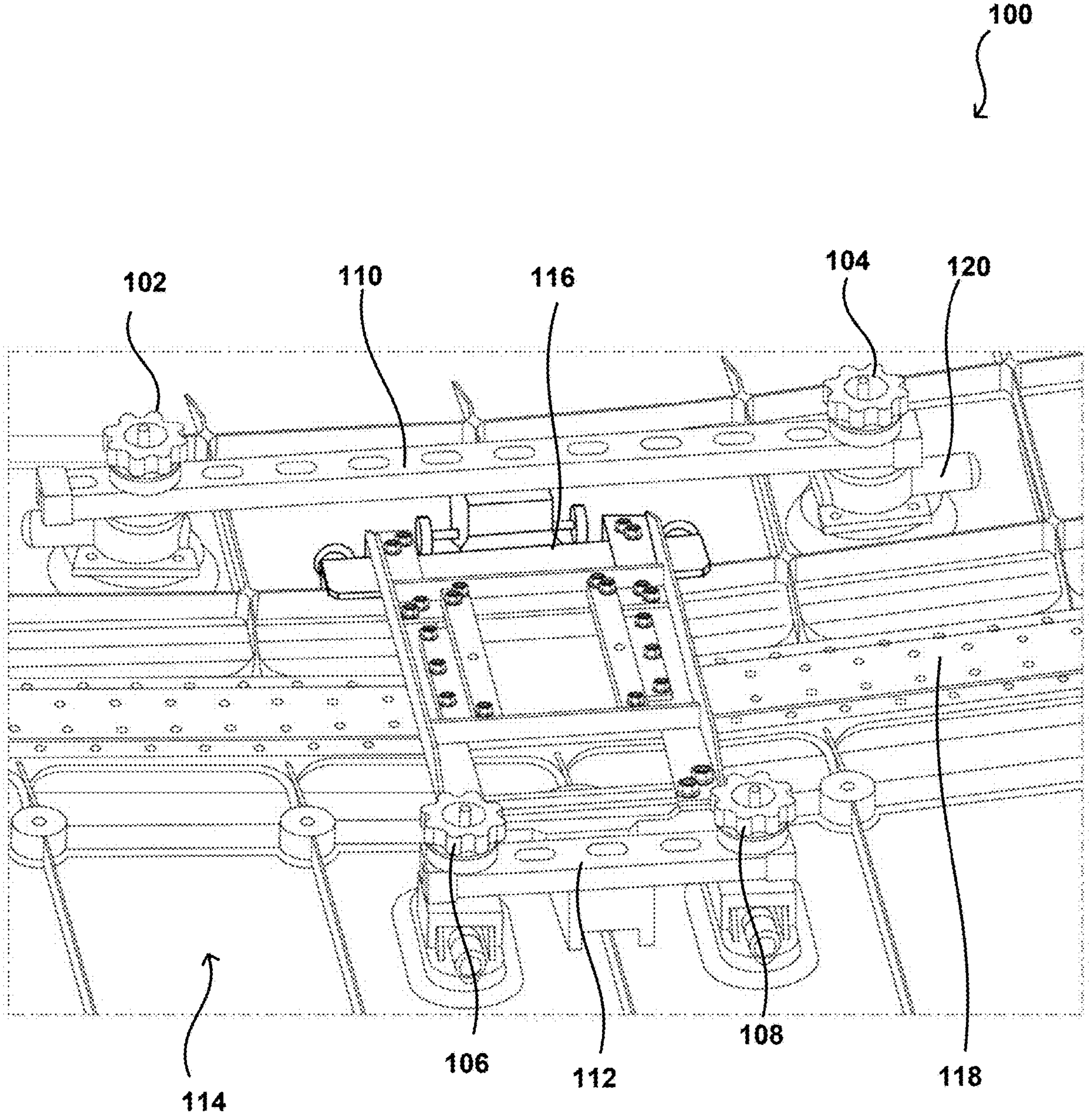
FIG. 1A illustrates a perspective view of a drill jig temporarily secured to the interior of a cylindrical tank using a set of gimbal knobs, in accordance with at least one embodiment.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles “a”, “an”, “the”, and “said” are intended to mean that there are one or more of the elements. The terms “comprising”, “including”, and “having” are intended to be inclusive and mean that there may be additional elements other than the listed elements. Any examples of operating parameters and/or environmental conditions are not exclusive of other parameters/conditions of the disclosed embodiments. Additionally, it should be understood that references to “one embodiment”, “an embodiment”, “certain embodiments”, or “other embodiments” of the present disclosure are not intended to be interpreted as excluding the existence of additional embodiments that also incorporate the recited features. Furthermore, reference to terms such as “above”, “below”, “upper”, “lower”, “side”, “front”, “back”, or other terms regarding orientation or direction are made with reference to the illustrated embodiments and are not intended to be limiting or exclude other orientations or directions. It should be further appreciated that terms such as approximately or substantially may indicate +/−10 percent.

As used herein, a clamping assembly may refer to a pair of clamping devices that can be connected to secure two objects together, such as to clamp an object to a surface. This may include a clamp mount that is connected to the surface, and a “top” or clamping device that can be positioned opposite the clamping device with respect to the object. The clamping device and clamp mount of a clamping assembly can work together to at least temporarily clamp or secure the object in place with respect to the surface. Clamping can be accomplished through application of a force or pressure to at least one of the clamping devices or clamp mounts, which may be applied through rotation of a threaded assembly or another such approach.

As used herein, a clamp mount may refer to a component that is able to be securely and stably mounted to a surface or object. The clamp mount can include a securement mechanism such as a suction cup, vacuum seal, magnet, adhesive, or other such mechanism that allows the clamp mount to be attached to a surface, element, or object to which another object is to be clamped. The clamp mount can also include a connection mechanism, such as a connecting bolt or shaft that can be received by a clamping device, or a receptacle to receive a connecting bolt from the clamping device. Although many embodiments discuss a gimbal joint in a clamping device such as a gimbal knob, in other embodiments a clamp mount can include a gimbal joint for receiving a connection mechanism over a range of angle.

As used herein, a gimbal knob refers to a clamping device, of a clamping assembly, that includes a gimbal joint that is able to pivot over a range of angles with respect to a primary axis of rotation of the gimbal knob. The gimbal knob can include a turnable knob portion enabling a human (or other source) to rotate the knob to tighten, or loosen, the clamping assembly with respect to the object being clamped. The gimbal knob can also include a planar flat bottom that can contact the object when clamped in order to provide for sufficient contact and stability of the clamped object. When an object is clamped, the gimbal joint can be at an angle with respect to an axis of rotation of the gimbal knob.

As used herein, a gimbal joint refers to a housing that can pivot within a cavity of a gimbal knob. The gimbal joint can include a threaded receptacle to receive a connecting bolt, or other connection member, and can have recesses around a circumference of a gimbal housing into which ball bearings can be placed. The ball bearings can sit between the gimbal housing and interior recesses of a gimbal knob in order to allow for pivoting of the gimbal housing, while not allowing for independent rotation of the gimbal housing with respect to the turnable knob.

FIG. 1A illustrates aspects of a set of clamping assemblies being used to securely connect or "clamp" together various components during assembly of a device, component, or system. In particular, FIG. 1A illustrates an example perspective view 100 of four clamping assemblies 102, 104, 106, 108 that are used to securely clamp a pair of crossbars 110, 112 to the interior surface of a fuel tank 114. The crossbars 110, 112 are positioned parallel and co-planar to each other, in order to provide a support structure for a drill jig 116. In this example, the drill jig 116 is to be used to attach one or more doubler and/or tripler plates 118 to the interior of the tank to provide additional strength to a weld seam (not illustrated in FIG. 1A as being on the other side of a doubler and/or tripler plate 118). It should be understood, however, that such clamping assemblies can be used for other purposes, in different numbers, and in various other assemblies or environments, within the scope of the various embodiments. The clamping assemblies are each attached to the interior surface of the fuel tank 114 using a vacuum cup 120 or other vacuum/suction-based mechanism, although other securement approaches (e.g., magnets or adhesive) can be used as well within the scope of the various embodiments.

As illustrated in FIG. 1A, the crossbars 110, 112 are to be secured in an arrangement that is approximately co-planar and parallel in order to properly support the drill jig 116. The interior surface of the fuel tank 114, however, is cylindrical in nature, such that the local area of the interior surface of the fuel tank 114 proximate the location of each clamping assembly 102, 104, 106, 108 will be angled, or non-parallel, with respect to the plane of the crossbars once installed. In other words, a surface normal at the point of attachment of a given clamping assembly to the tank surface will be angled with respect to a surface normal for a crossbar being secured by the clamping assembly. As illustrated, the angle can increase as the crossbars get longer and/or the distance between clamping assemblies increases, due to the curvature of the tank.

Figure 1B:
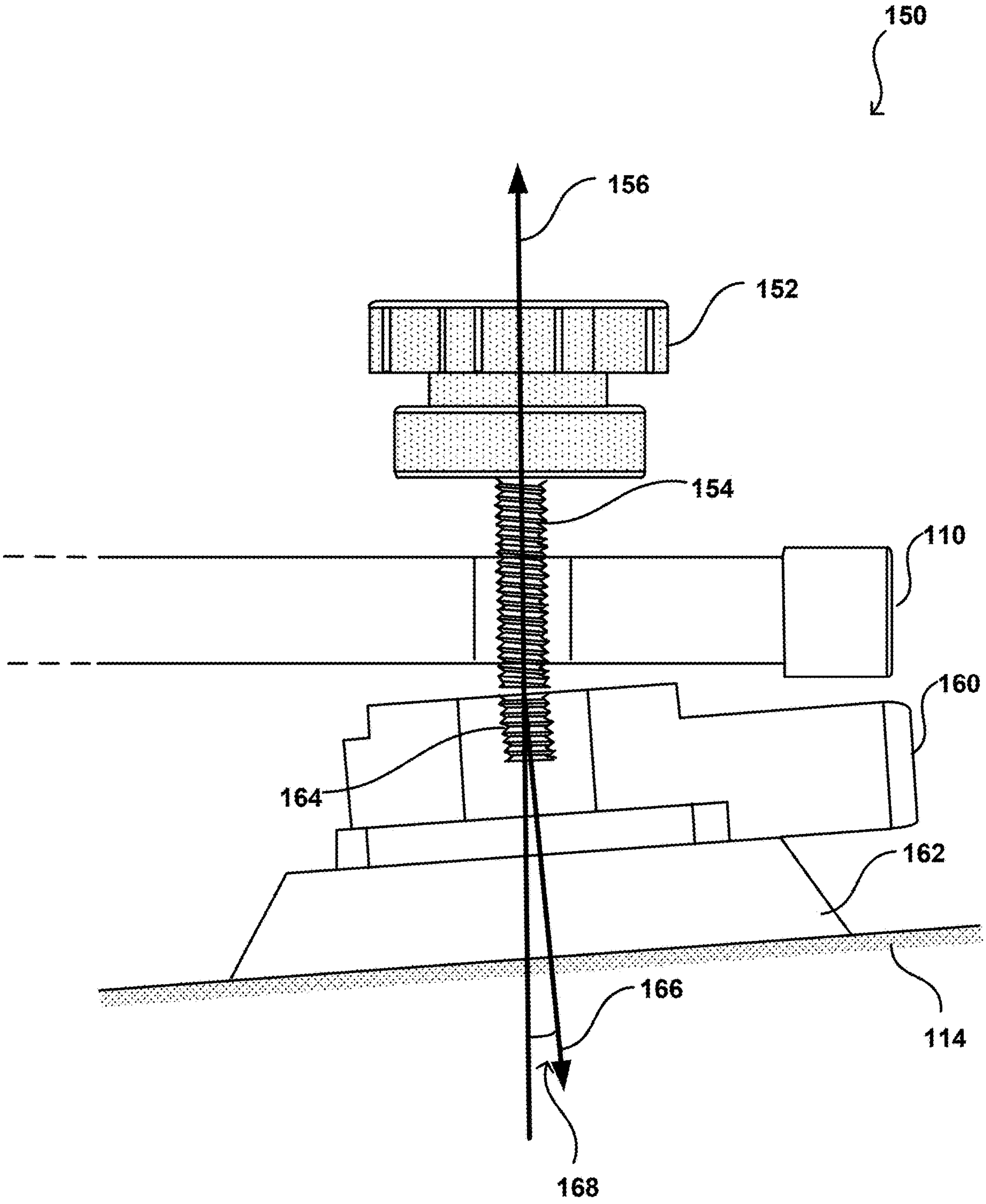
FIG. 1B illustrates a cross-sectional view of a clamp mount and a knob without a gimbal joint, in accordance with at least one embodiment.

The presence of such angular differences, and the range of potential angles that may be encountered, can create difficulties if attempting to use a conventional-style clamping mechanism. FIG. 1B illustrates a cross-sectional view 150 of a clamping assembly that could be used to attempt to clamp a crossbar 110 to an inner surface 168 of a cylindrical tank as discussed with respect to FIG. 1A. In this example, a clamping assembly includes two primary parts: (1) a tightening knob 152 with a connecting bolt 154 (e.g., a threaded metal rod), and (2) a clamp mount 160 including a mounting mechanism 162 (e.g., a vacuum cup-inclusive housing) and a threaded receptacle 164. In order to clamp the crossbar 110 to the interior surface of the fuel tank 114, the mounting mechanism 162 of the clamp mount is attached to the interior surface of the fuel tank 114 and the connecting bolt 154 is placed through an opening in the crossbar 110. Once the connecting bolt 154 is aligned with the threaded receptacle 164, the tightening knob 152 can be turned (such as through hand-turning) to cause the threads of the connecting bolt to move into the corresponding threads of the threaded receptacle 164, causing the connecting bolt 154 to move into the threaded receptacle 164. In a well-aligned example, the tightening knob 152 could be turned until the connecting bolt can no longer move any deeper into the threaded receptacle, and if sufficiently tightened the presence of the connecting bolt 154 in the threaded receptacle 164 can cause the crossbar to be rigidly secured to the interior surface of the fuel tank 114 via the clamping assembly.

In this example, however the connecting bolt 154 is not able to be properly aligned with the threaded receptacle 164 while the mounting mechanism 162 is secured to the underlying surface. Even if the opening in the crossbar 110 is sufficient to allow the connecting bolt 154 to be initially aligned, at some point the knob will come into contact with the crossbar 110 and due at least in part to the misalignment. the tightening knob 152 will not be able to be turned to enable a majority of the bottom surface of the knob to make contact with the crossbar, which can prevent the crossbar from being securely and rigidly clamped to the inner surface of the tank, which can create potential issues with respect to the stability of the drill jig, and can also generate a potential safety concern.

As illustrated, the connecting bolt 154 has a primary axis 156 of motion or securement. That is to say, when the tightening knob is rotated in the appropriate direction (which corresponds to the direction of threading of the connecting bolt 154), the connecting bolt will be moved along the primary axis 156 of motion or securement. The threaded receptacle 164 of the clamp mount 160 will have similar threads to be able to receive at least a portion of the threaded connecting bolt 154, and will also have a corresponding motion axis 166, whereby a bolt inserted into the receptacle and turned in the appropriate direction will be drawn into the receptacle in a direction along the motion axis 166. As illustrated, however, the primary axis 156 of motion or securement of the connecting bolt 154 is at an angle 168 with respect to the motion axis 166 of the threaded receptacle. This angular difference between the primary axes 156, 166 can prevent the bolt from being able to be rotated into the threaded receptacle 164, and can thus prevent this clamping assembly from being able to be used to secure the crossbar 110 to the interior surface of the fuel tank 114. It should be understood that in other embodiments the connecting bolt 154 may be part of the clamp mount 160, and the threaded receptacle 164 contained within the tightening knob 152.

Figure 2A:
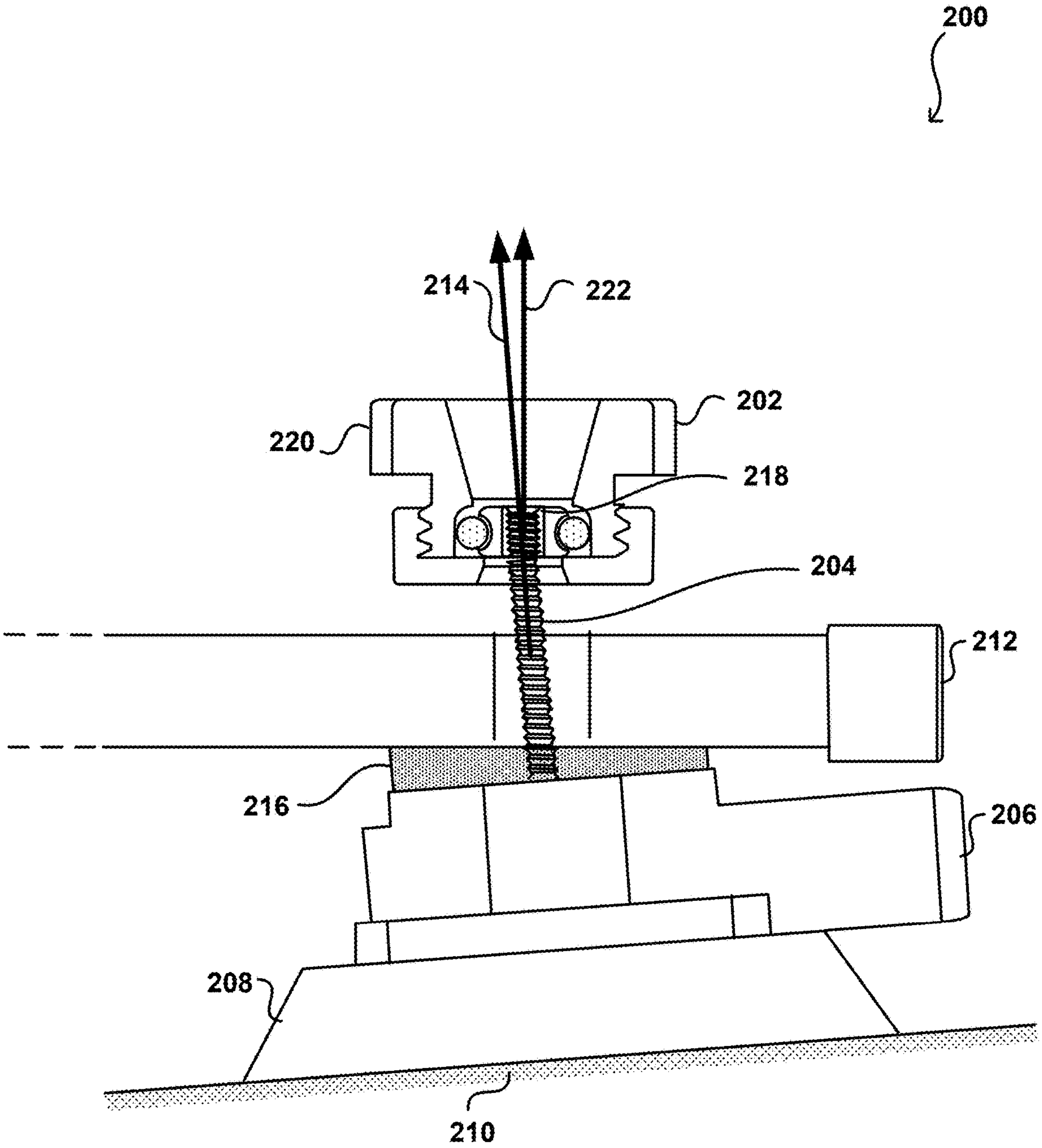
FIGS. 2A, 2B, and 2C illustrate cross-sectional views of a connecting bolt of a clamp mount being received into a gimbal joint of a gimbal knob, in accordance with at least one embodiment.

Approaches in accordance with various embodiments provide for the use of a gimbaled or adjustable joint mechanism that allows a clamping assembly to be used in locations where the objects to be clamped may not have at least locally parallel surfaces. FIG. 2A illustrates a cross-sectional view of a clamping assembly 200 that can be used in accordance with various embodiments. In this example, the clamping assembly 200 includes a gimbal knob 202 that can be used to receive a connecting bolt 204 associated with (e.g., part of, or connected to) a clamp mount 206. The clamp mount 206, in this example, includes at least one suction cup 208 (or other attachment member or mechanism) that can be attached to an underlying surface 210. During installation, the clamp mount 206 can be attached to the underlying surface 210, such that the connecting bolt 204 extends upward and away (in this orientation) from the surface in a direction that is substantially orthogonal to the local plane of the underlying surface 210 (or otherwise parallel to a local surface normal). The crossbar 212 can be positioned on the clamp mount 206 with the connecting bolt 204 being passed through an opening (or cutaway or recess, etc.) in the crossbar 212, such that an underside of the crossbar 212 rests on, or otherwise contacts, an upper surface of the clamp mount. In this example, a compressible washer 216 is placed proximate the upper surface of the clamp mount. The compressibility and/or deformable nature of the compressible washer 216 allows the washer to support an object such as a crossbar 212 that may be at an angle with respect to the upper surface, within a supported angular range of the clamping assembly. In some embodiments where a specific angle is to be supported, a beveled washer can be used that is shaped according to that angle, to provide maximum support between the bottom of the crossbar 212, or other object being clamped or held in place, and the top of the clamp mount 206 or other clamping component to be positioned proximate the compressible washer 216.

As illustrated, a gimbal knob 202 can be oriented such that the opening of a threaded receptacle 218 is proximate an exposed end of the connecting bolt 204. The connecting bolt 204 can then be inserted into the threaded receptacle 218, such that when the hand-turnable knob 220 is rotated in the proper direction, the connecting bolt 204 is pulled into the threaded receptacle 218. In this example, as with the example of FIG. 1B, the motion axis 214 of the connecting bolt is at an angle with respect to the primary motion vector 222 of the gimbal knob. The connecting bolt 204 can be difficult to pull into the threaded receptacle 218 if the primary direction of motion of the threaded receptacle differs from the primary axis 214 of motion of the connecting bolt.

Figure 2B:
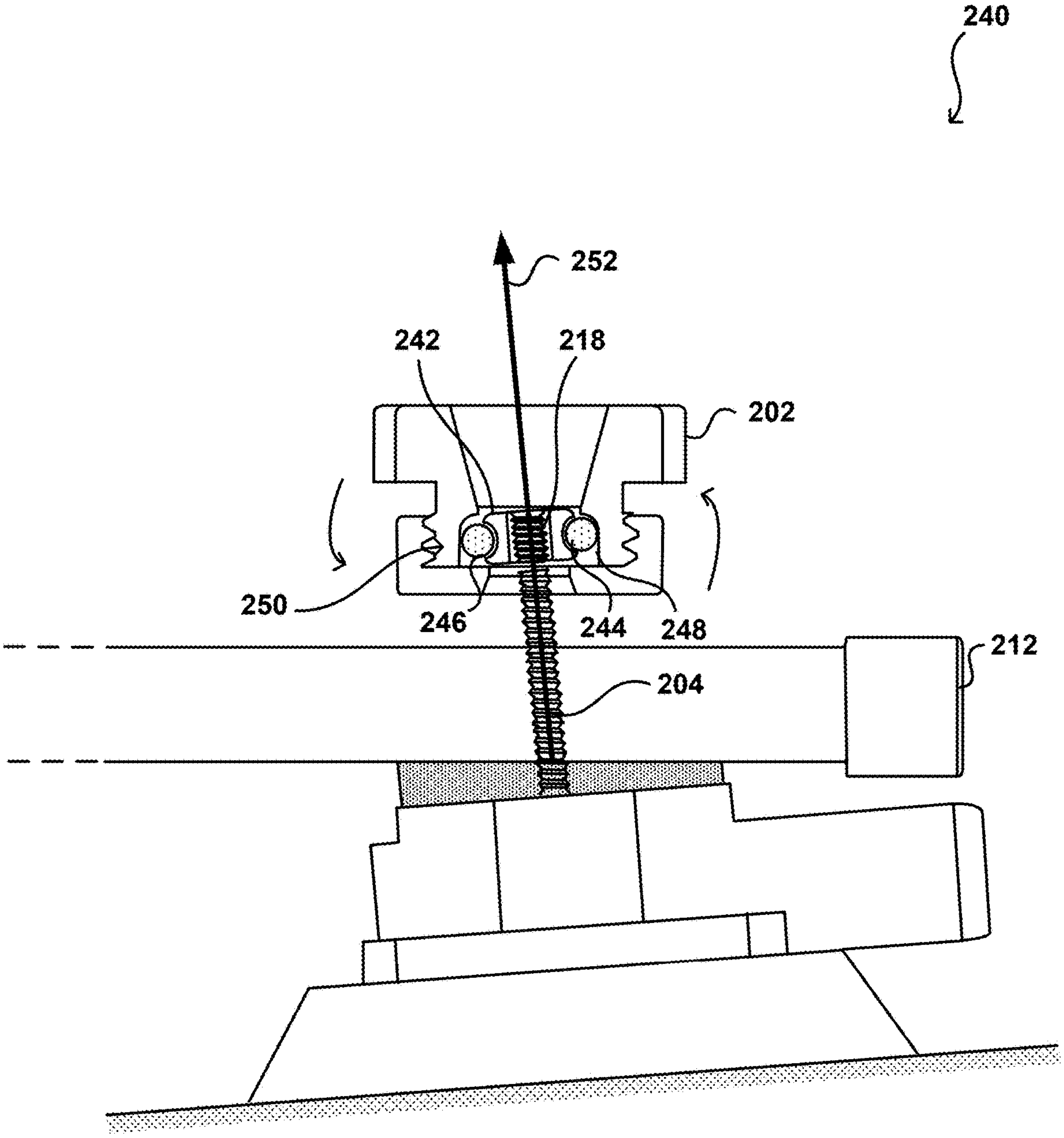

As illustrated in the cross-sectional view of a clamping assembly 240 of FIG. 2B, however, the gimbal knob 202 includes a gimbal housing 242 supporting the threaded receptacle 218. It should be understood that reference numbers may be carried over between figures for similar components for ease of explanation and understanding, but such usage should not be interpreted as a limitation on the scope of the various embodiments unless otherwise specifically stated. The gimbal housing 242 also includes a number of outer recesses 244 that are able to receive (portions of) a number ball bearings 246 placed partially within the outer recesses 244. The individual ball bearings 246 will also contact a respective inner recess 248 of the gimbal knob 202. These components together form a gimbal joint 250. A zoomed view of at least some of these (and other relevant) components of the gimbal joint 250, with additional, detail is presented later herein, such as with respect to FIG. 3A. When the connecting bolt 204 is brought into contact with the threaded receptacle 218, the gimbal joint 250 can pivot so that the primary axes of motion of the connecting bolt 204 and the threaded receptacle 218 are to correspond to a similar primary axis 252. The gimbal joint 250 can be oriented such that the motion axis of the threaded receptacle 218 remains aligned with the motion axis of the connecting bolt, even as the gimbal knob is turned. The gimbal joint itself will rotate with the gimbal knob, but the ball bearings 246 are able to rotate independently such that the gimbal joint 250 maintains the necessary orientation to allow the connecting bolt 204 to be drawn into the threaded receptacle 218. As the gimbal knob 202 is rotated and the connecting bolt 204 is drawn into the threaded receptacle 218, the gimbal knob will be drawn closer to the top surface of the crossbar 212 through which the connecting bolt 204 is extended. There will also be slight lateral movement of the gimbal knob 202 (to the right in FIG. 2B) as the gimbal knob 202 is pulled closer to the crossbar.

Figure 2C:
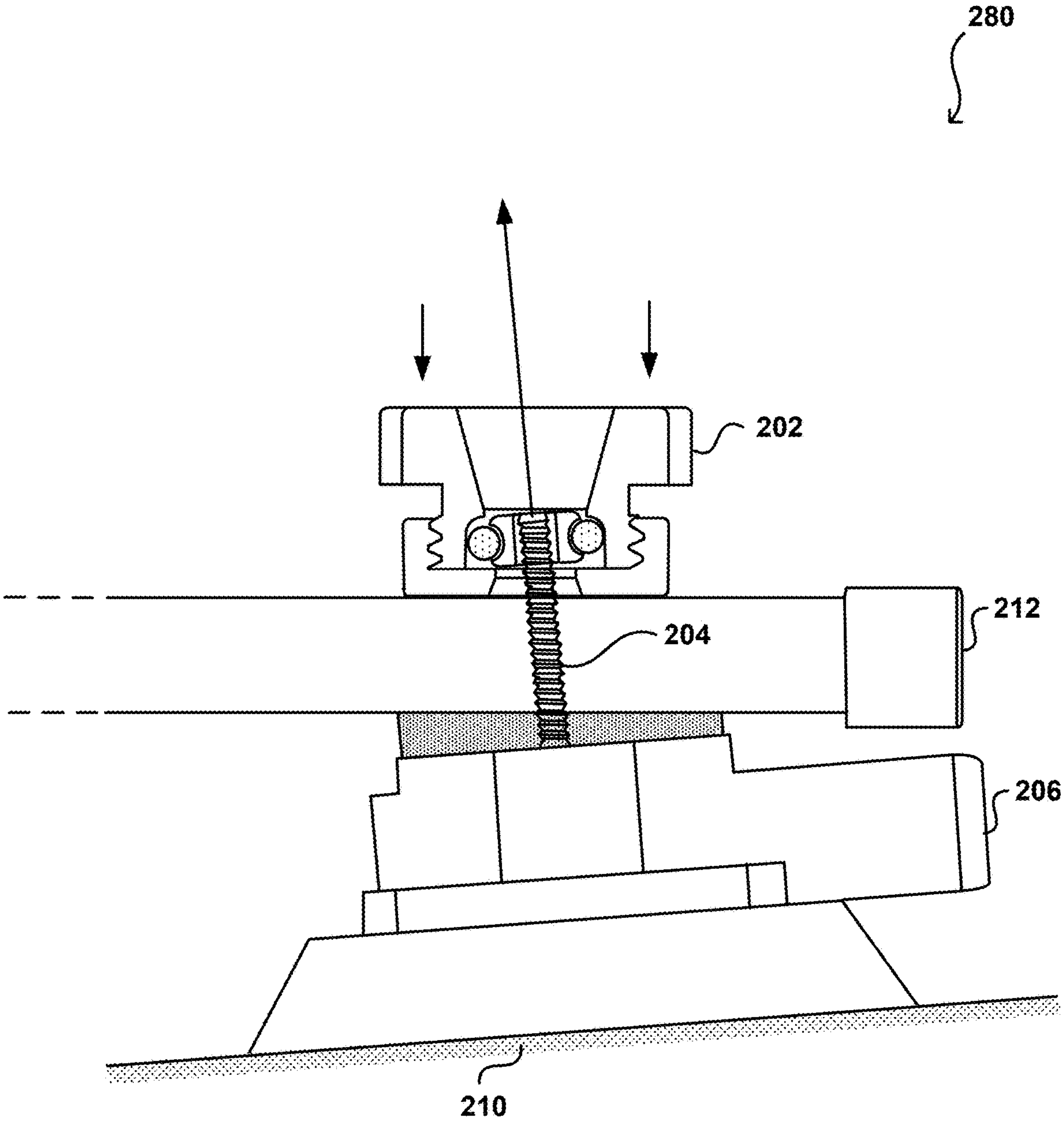

Eventually, the gimbal knob 202 will come into contact with the crossbar 212, as illustrated in the cross-sectional view of a clamping assembly 280 of FIG. 2C. The gimbal knob 202 can be tightened (by rotation) until the gimbal knob 202 is securely in place, essentially locking the crossbar 212 to the underlying surface 210 via the clamping assembly. As illustrated, the gimbal knob 202 is positioned on the crossbar in an orientation that is horizontal in FIG. 3B, while the clamp mount 206 (including the connecting bolt 204) and the underlying surface 210 are at an angle with respect to horizontal. Such an approach allows a clamping assembly 200 to be used to secure two members (e.g., objects or surfaces) together even if the clamped portions of those members are at an angle with respect to each other. Further, a benefit of a gimbal knob 202 as presented herein is an entire angular range that can be supported, providing additional flexibility for the same gimbal knob 202 to be used for a number of different locations or clamping tasks. Further, such a gimbal knob 202 can be used with any clamp mount 206 (or similar mechanism) that has a connecting bolt (or other such component) of the appropriate size and threading.

Figure 3A:
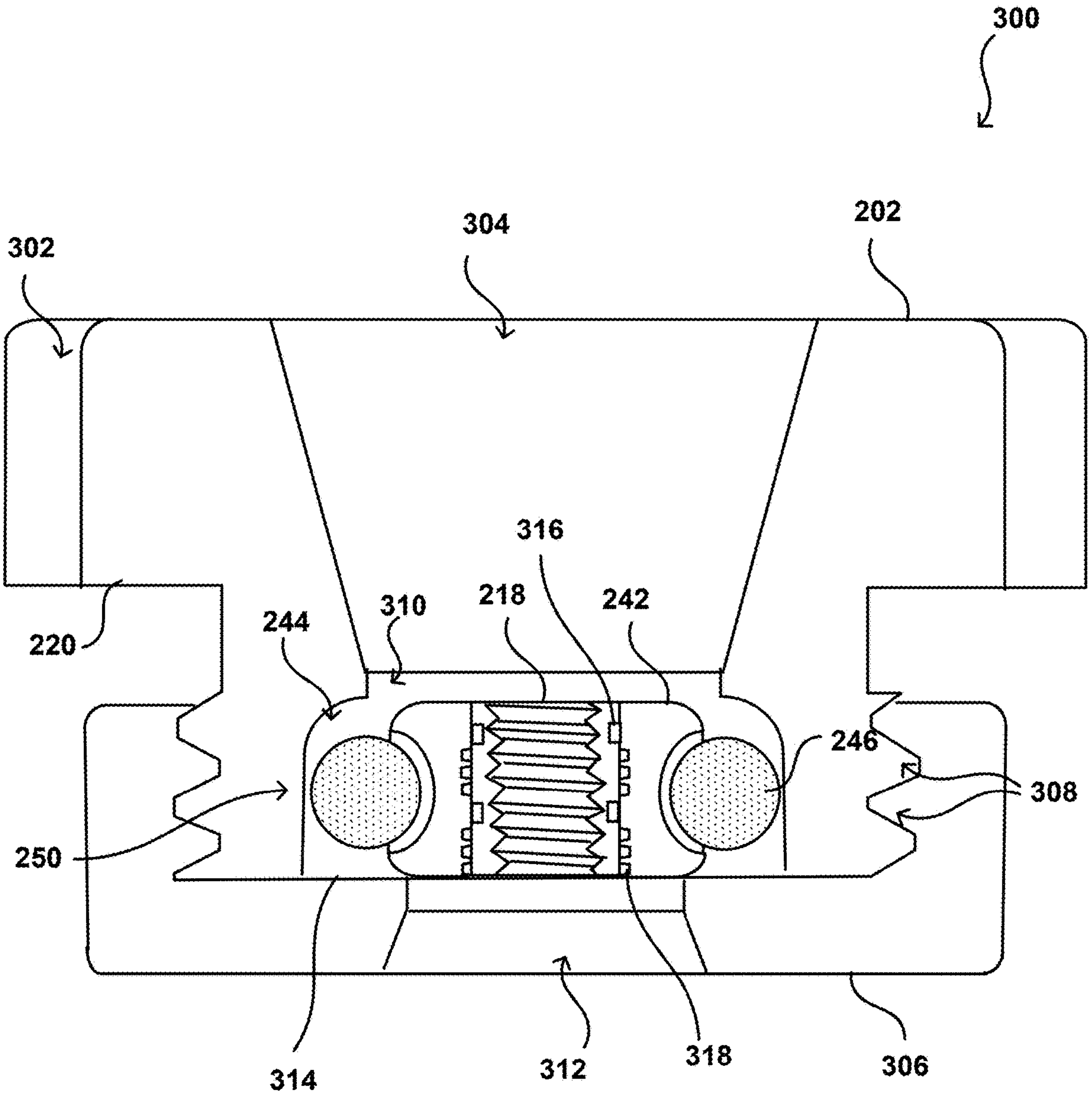
FIG. 3A illustrates a detailed cross-sectional view of a gimbal knob, in accordance with at least one embodiment.

FIG. 3A illustrates a detailed cross-sectional view 300 of an example gimbal knob 202 in accordance with at least one embodiment. As illustrated, the gimbal knob 202 includes a hand-turnable knob 220 that is typically formed from a plastic or polymer, and is shaped to allow for grasping and rotation by a human hand. The hand-turnable knob 220 includes a number of recesses, as illustrated more clearly in FIG. 4, that can be grasped by individual human fingers to both help avoid slipping during hand rotation of the knob, as well as to enable the person to apply more rotational pressure to the knob. In this example, the hand-turnable knob 220 includes a central opening 304. This opening helps to decrease the weight of the knob, while also reducing the amount of material needed. The central opening 304 is shaped with angular walls so that a connecting bolt can pass through the threaded receptacle 218 of the gimbal joint 250 over a range of potential angles, to provide adequate clamping of an object, while not restricting the connecting bolt or causing the clamping to stop before adequate clamping is achieved.

The gimbal knob 202 also includes a knob bottom 306 that can be connected to the hand-turnable knob 220 to form an enclosure or cavity around the gimbal joint 250. In at least one embodiment, the hand-turnable knob 220 and knob bottom 306 can both be 3D printed parts formed from polymers (the same or different) or other such materials. For example, these or other such parts can be made from metals or harder, more robust materials. A number of threads 308 (or other interleaved members) can be included that help hold the hand-turnable knob 220 and knob bottom 306 together to function as a single knob piece. The hand-turnable knob 220 can have an internal cavity 310 for receiving the gimbal joint 250, as well as a number of outer recesses 244 about an inner circumference of the internal cavity 310 that are shaped to receive the respective ball bearings 246 to both support the gimbal joint 250 and allow the gimbal joint 250 to pivot within the internal cavity 310. When the knob bottom 306 is connected to the hand-turnable knob 220, an inner ring 314 of the knob bottom 306 can complete the enclosure around the gimbal joint 250, with the ring having a central opening 312 with angled walls to allow a connecting bolt to pass through the knob bottom 306 to be received by the threaded receptacle 218 of the gimbal joint 250. In at least one embodiment, the hand-turnable knob 220 and the knob bottom 306 (or other "top" and "bottom" pieces) can each be 3D printed (or molded or otherwise formed) from a plastic, polymer, or other such material, and can be secured together using an epoxy, set of screws, or other such mechanism(s). The gimbal housing 242 can also be 3D printed (or otherwise formed) from a plastic or polymer, of similar or different material to other components of the gimbal knob 202.

A gimbal joint 250 can include a number (e.g., six) of recesses into which portions of a corresponding number of ball bearings 246 can be received, although different numbers of bearings can be used in different embodiments, as may depend in part upon the angular range needed and other such factors. The bearings may be formed of any appropriate material, such as a polymer or ceramic, and may have a coating in at least one embodiment to provide strength or reduce friction, among other such advantages. In some embodiments, a lubricant may be used as well to assist with smooth and easy motion of the bearings within the recesses, particularly when using bearings formed from a metal or similar material. Stronger materials such as metal may be used instead of polymers for the bearings, or other relevant components, where a higher clamping and/or rotational tightening load is required. Other pivot-facilitating components can be used as well, and may relate to springs or various other components that are compressible, expandable, or motion-capable. In at least one embodiment, a heat-set threaded insert can be affixed to an interior of the gimbal housing 242, forming the threaded receptacle 218 to receive a similarly threaded connecting bolt. The insert can be formed from a metal or other sufficiently strong material to hold the threads of the connecting bolt. The insert may include a number of external threads 318, protrusions, lips, or other such mechanisms that enable the insert to be securely inserted into the gimbal housing 242 through rotation, which can also help to prevent the insert from being pulled or pushed out of the gimbal housing along the primary axis of motion (in a vertical direction in the figure). In order to further prevent the insert from being pulled out of the gimbal housing 242, one or more lips 316, bumps, protrusions, or other mechanisms or features can be used that allow the insert to be positioned in the gimbal housing (such as by using a rotation) but prevent removal due to lateral force applied to the insert. Other approaches can be used as well, such as to provide a lip or ring on either side of the gimbal housing after installation of the insert, in order to prevent the insert from being inadvertently pulled or pushed out of the gimbal housing 242. As mentioned, the recesses used to at least partially enclose the bearings are shaped such that the bearings allow for pivoting of the threaded insert to an off-normal angle with respect to a direction of motion of the gimbal knob, but do not allow for rotational motion of the gimbaled joint within (or separate from) the gimbal knob, which allows for rotation of the gimbal knob to be similarly applied to the threaded insert, in order to enable driving of a threaded bolt into the threaded insert to provide the tightening and clamping ability.

Figure 3B:
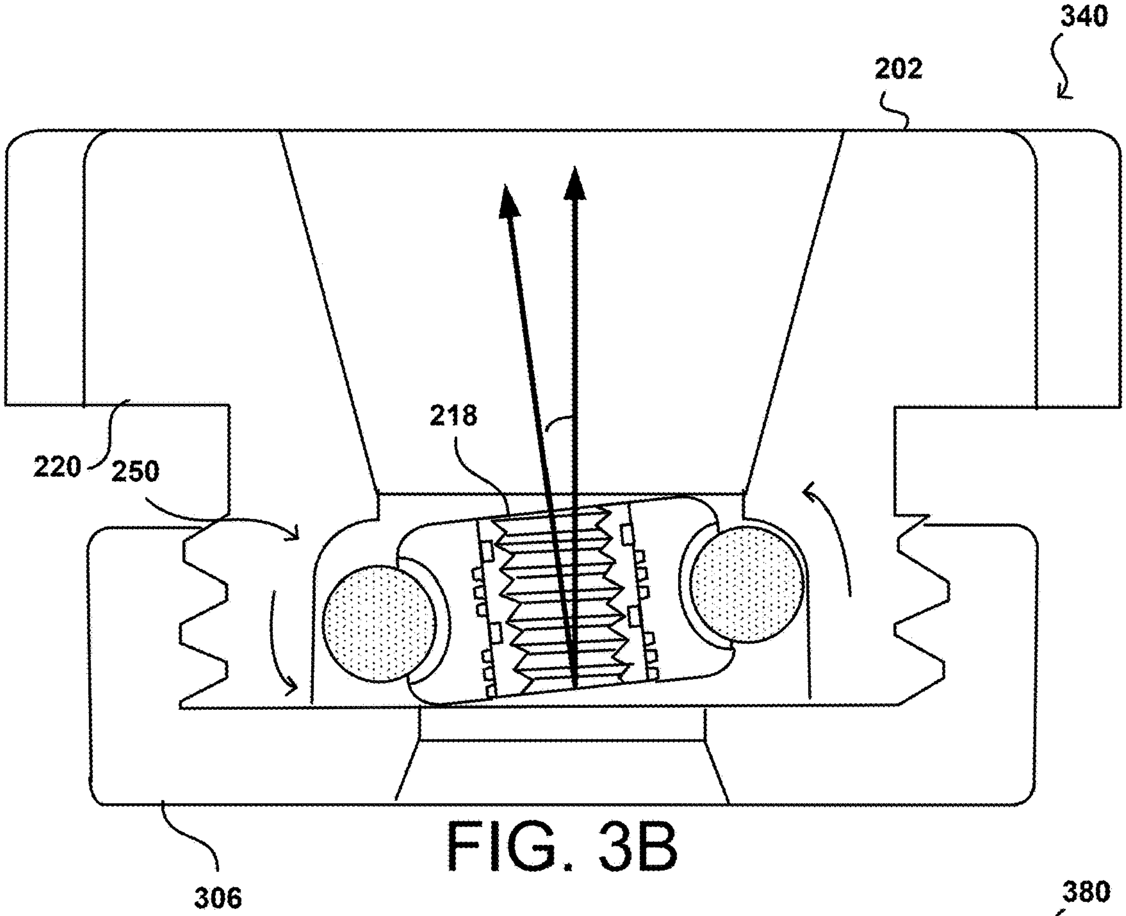
FIGS. 3B and 3C illustrate cross-sectional views of different pivot positions of a gimbal joint in a gimbal knob, in accordance with at least one embodiment.
Figure 3C:
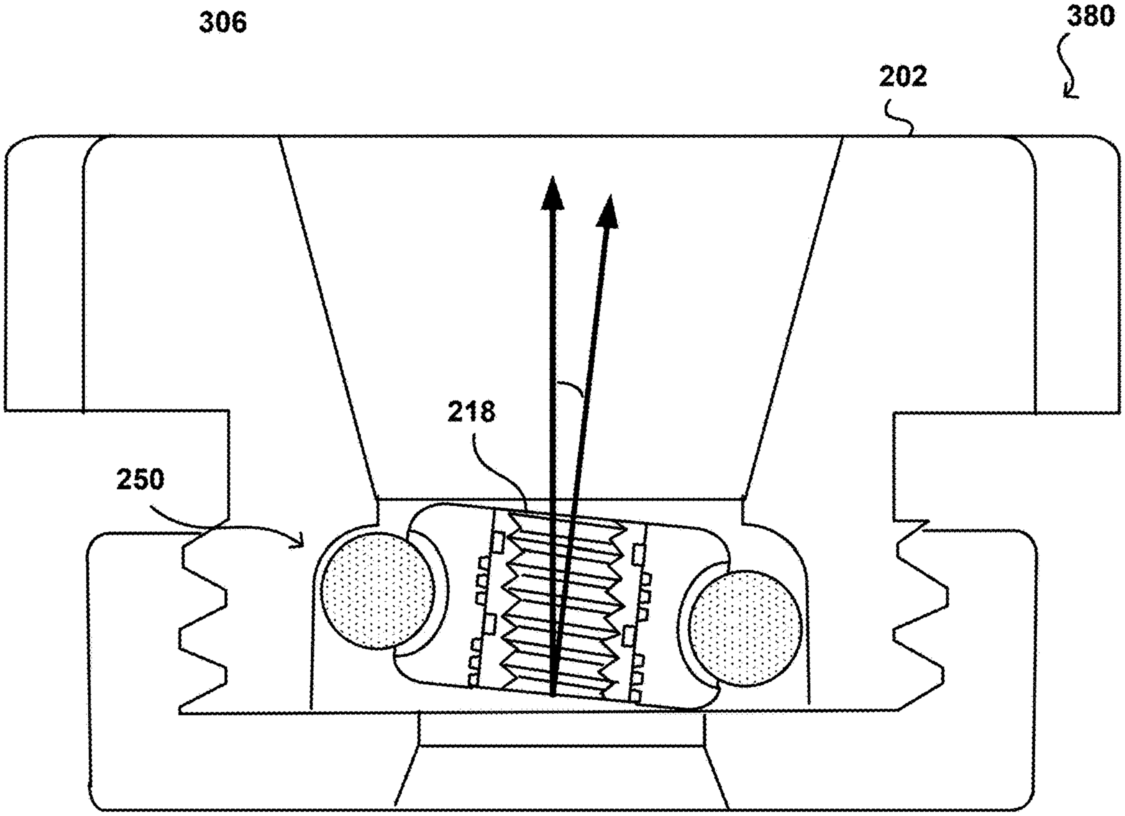

As mentioned, the ball bearings 246 positioned about the gimbal housing 242 allow the gimbal joint to pivot as needed to accommodate a connecting bolt at an appropriate angle (within the allowable angular pivot range), while the outer recesses 244 in the interior of the hand-turnable knob 220 prevent the gimbal joint 250 from rotating independently of the gimbal knob 202 (at least by more than the amount of difference in diameter between a bearing and the respective recess). FIGS. 3B and 3C illustrate alternative cross-sectional views 340, 380 demonstrating the pivoting capability of the gimbal joint 250 within the gimbal knob 202. It should be understood that due to the nature of the figures, the gimbal joint is shown to pivot in a counterclockwise direction (FIG. 3B) and a clockwise direction (FIG. 3C), but the pivoting of the gimbal joint in at least this embodiment can be in 360 degrees of rotation, such that the gimbal joint can pivot at least partially "into" or "out of" the plane of FIGS. 3B and 3C as well. In some embodiments, the angular range over which the gimbal joint can pivot may be limited, such as through placement of bearings or similar motion-supporting elements (e.g., springs, slides, or deformable membranes) over less than a full circumference, or other relevant portion, of the gimbal joint 250. As illustrated, the ability of the gimbal joint 250 to pivot within the gimbal knob 202 allows the threaded receptacle 218 to be positioned, and remain, at an orientation needed to receive a connecting bolt, while allowing the knob bottom 306 to be positioned at a different angular orientation that may coincide with the part or object that is to be clamped or secured by the gimbal knob 202.

Figure 4:
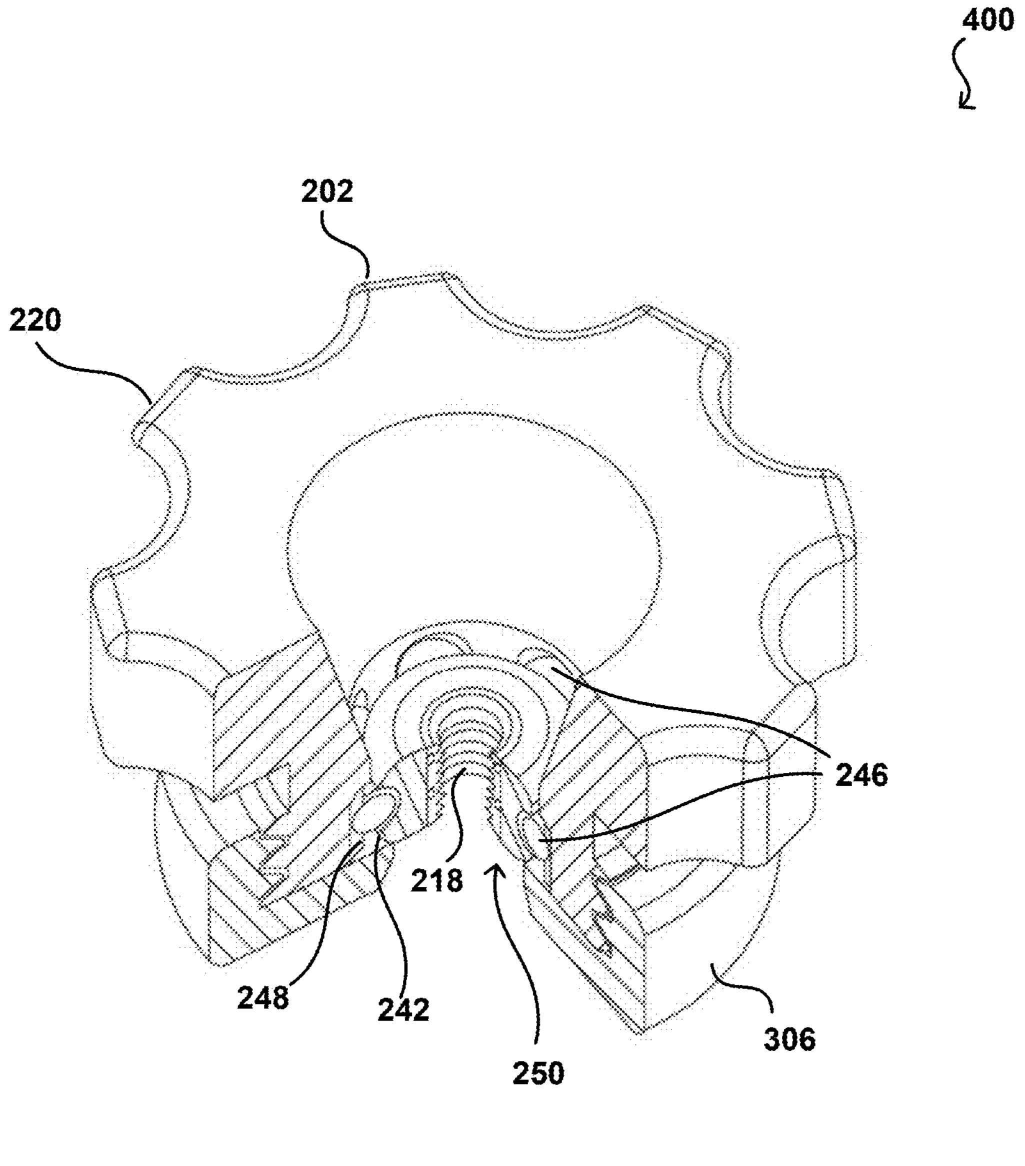
FIG. 4 illustrates a perspective cut-out view of an example gimbal knob, in accordance with at least one embodiment.

FIG. 4 illustrates a perspective view 400 of an example gimbal knob 202 in accordance with at least one embodiment. This perspective view 400 illustrates the ring shape of the gimbal housing 242, with external features (e.g., external threads or a lip) to prevent the metal threaded receptacle 218 from being pulled out of the gimbal housing 242. In this example, there are six ball bearings 246 (e.g., Delrin ball bearings) positioned around an outer circumference of the gimbal housing 242 (with one not being illustrated in the figure, and two being partially illustrated, due to the cut-out view). The inner recesses 248 of the gimbal knob 202 are elongated, parallel to the axis of primary motion of the threaded receptacle 218, such that each of the bearings can move in that elongated direction to allow for pivoting of the gimbal joint 250. The inner recesses 248 in this example are also shaped to allow for some lateral and/or circumferential motion (orthogonal to the axis of primary motion) since the bearings will need to be able to move in a non-linear fashion in order to allow for the pivoting of the gimbal joint 250. In one embodiment, the size of a given inner recess 248 can be greater than the size of the corresponding portion of the ball bearing 246 that is to be received in the housing, allowing for some motion of the bearing in any direction. The size of an inner recess 248 should, however, be selected to also prevent a ball bearing 246 from being able to unintentionally slip or move out of the recess during operation. The size of an inner recess 248 should also be such, in at least one embodiment, that it allows for enough motion of a ball bearing 246 to support the intended pivoting of the gimbal joint 250, while also avoiding unnecessary lateral motion or otherwise negatively impacting the ability of the hand-turnable knob 220 to apply rotational force to the gimbal joint 250 during hand tightening (or loosening). In at least one embodiment, one or more surfaces of one or more components may have a surface texture or roughness selected to manage an amount of lateral friction, such as to prevent slippage or limit a possible rate of motion, among other such options.

It should be understood that other arrangements of such features can be practiced within the scope of the various embodiments as well. For example, a gimbal joint 250 could be placed within the clamp mount rather than the turnable knob, such that a connecting bolt connected to the turnable knob (or another such object) can be received at various angles into the clamp mount that will be attached to the surface or another appropriate object). There may be other configurations as well. An example clamping mechanism can include two pieces, one on either side of an object to be clamped or at least temporarily secured in place, and at least one of these can include a gimbal joint to allow for tightening along a direction that is different from the angle at which the actual clamping motion will occur.

Figure 5:
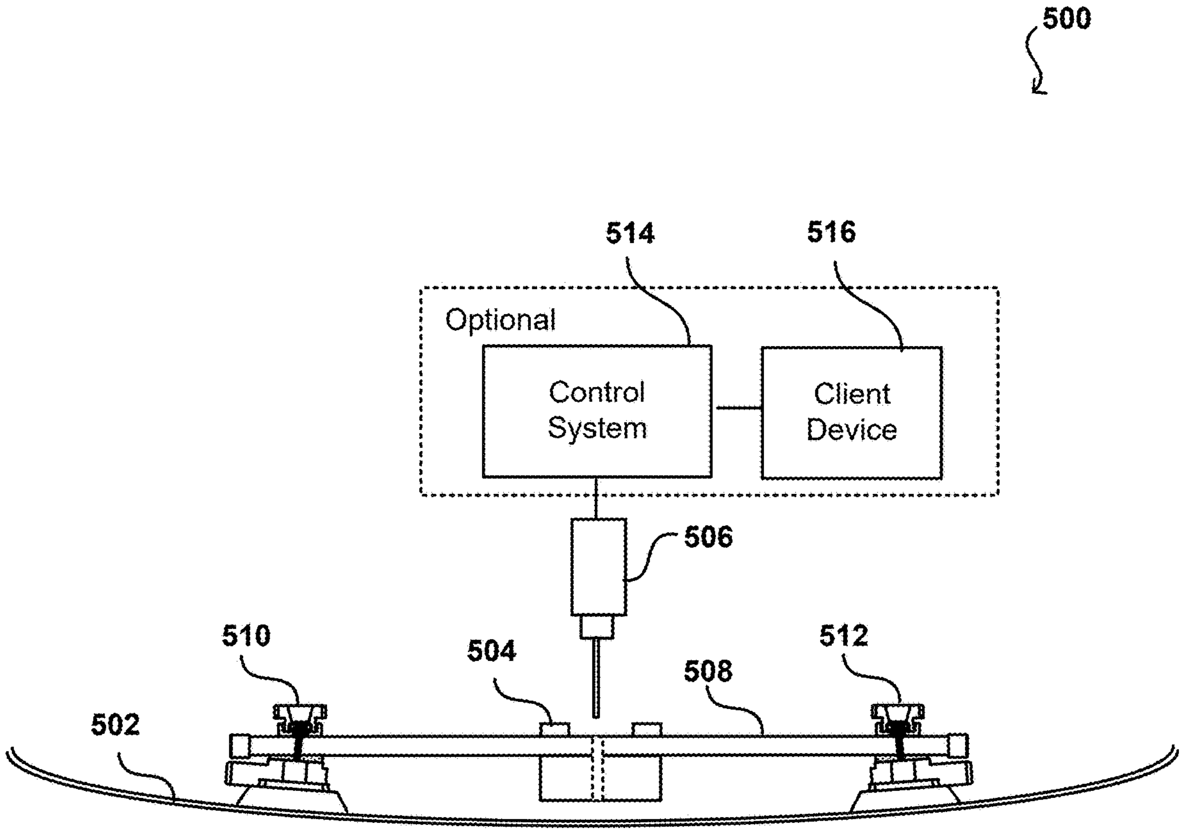
FIG. 5 illustrates a cross-sectional view of an object clamped into place in order to support a specific task, in accordance with at least one embodiment.

FIG. 5 illustrates a side view 500 of a clamped tool 504 being positioned to perform an operation with respect to a curved surface 502 of an object in accordance with at least one embodiment. The clamped tool 504 may be any appropriate tool, such as a drill jig or other device, to support performance of a physical task with respect to the curved surface 502. In this example, it is desired to secure the clamped tool 504 in a specific location and/or orientation relative to the curved surface 502. Although a concave surface is shown that might be on the interior of a tank, for example, the surface could be a convex surface representing an outer surface of a tank, or might represent an irregular surface or other shape for which conventional clamping devices may not be appropriate. This example approach uses a crossbar 508 or other securing mechanism that can be clamped to the curved surface 502, with the clamped tool 504 then able to be secured in place using the crossbar. In some embodiments, there may be one or more portions of a tool (or other object to be secured) that may be clamped to the curved surface 502 without use of a crossbar, or by using a combination of such approaches.

In this example, there are at two gimbal knob assemblies 510, 512 illustrated, although it should be understood that there may be additional gimbal knob assemblies used as well that may not be illustrated in this side view, such as is illustrated in FIG. 1A. As disclosed herein. each gimbal knob assembly 510, 512 can include a clamp mount, which can be attached to the curved surface 502 using vacuum, suction, adhesive, magnetics, or another such approach. The crossbar 508 can be positioned proximate these clamp mounts such that a connecting bolt of the clamp mounts passes through a portion of the crossbar, such as a hole, opening, gap, or cutaway in the crossbar. A gimbal knob including a gimbal joint can then be positioned to receive the connecting bolt, and hand turned to securely clamp the crossbar 508 between the gimbal knob and the clamp mount as discussed and suggested herein.

Once the crossbar 508 is secure, the clamped tool 504 can be used to perform a target task with respect to the curved surface 502. This may include use of a complementary tool 506, such as a tool, cutter, punch, welder, grinder, or other such tool, that can use the drill jig, guide, template, or other such device, which can work with the complementary tool 506, such as by guiding a drill bit using a drill jig. In some embodiments, the complementary tool 506 (or clamped tool 504) may be a manually operated tool and a human operator can cause the tool to perform the target task. In other embodiments, at least one of these complementary or clamped tools 504, 506 may be at least partially controlled by a control system 514, which can allow for automated operation or can be used to control certain aspects of the system, such as a speed of a drill, intensity of a laser, and the like. In some embodiments, the control system 514 can be operated directly by a human, at least to an extent which human interaction is necessary, or the control system 514 can be in communication with a client device 516, such as a desktop computer or operator terminal that includes a user interface enabling a human user to perform tasks such as to initiate or terminate performance of the task, as well as to control or modify aspects of the performance by the clamped tool 504.

Figure 6:
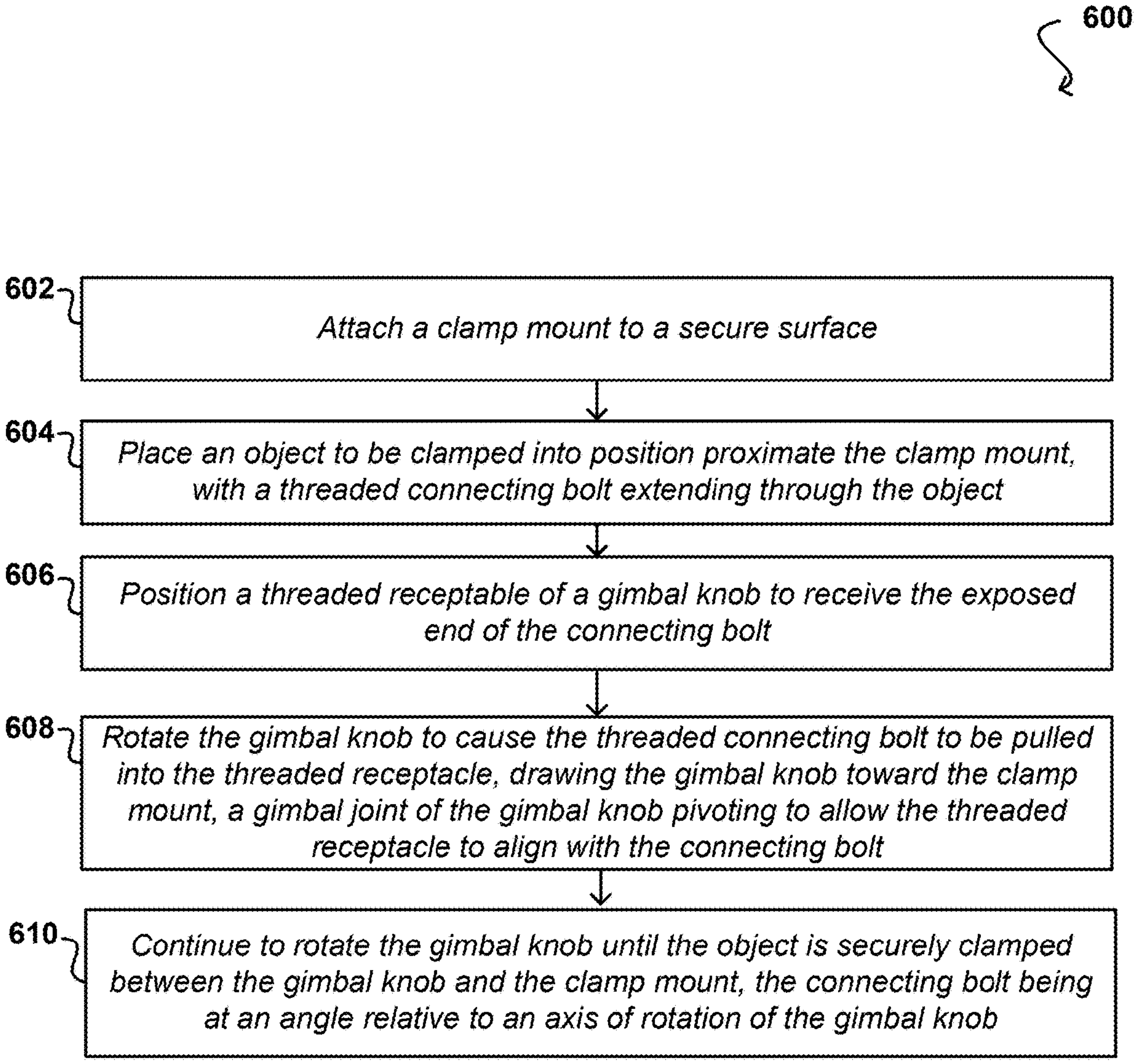
FIG. 6 illustrates an example process that can be performed to clamp an object into position using a gimbal knob, in accordance with at least one embodiment.

FIG. 6 illustrates an example process 600 to secure an object to at least one non-parallel surface in accordance with various embodiments. It should be understood that for this and other processes presented herein that there may be additional, fewer, or alternative operations performed in similar or alternative orders, or at least partially in parallel, within the scope of the various embodiments unless otherwise specifically stated. In this example, a clamp mount is attached 602 to a secure surface. As discussed herein, the clamp mount can be any device capable of being at least temporarily secured to at least one surface, such as by using suction, vacuum, magnetics, or the like. The clamp mount can include at least one clamping, fastening, or securement mechanism to which a gimbal knob can be attached, which in this example comprises a connecting bolt, but in other embodiments could include a screw, rod, lever, or other such component that requires, or at least benefits from, a specific angular or directional alignment for clamping. An object to be clamped into position can be placed 604 proximate the clamp mount, with at least one threaded connecting bolt (or other securement component) extending through the object. The connecting bolt can extend through an opening, hole, or cutaway in the object, for example, which allows a portion of the connecting bolt to pass through the object and extend on the other side.

A threaded receptacle of a gimbal knob can be positioned 606 to receive the exposed end of the connecting bolt that is passed through the object. The threaded receptacle may be a threaded hole that passes through a gimbal joint of the gimbal knob, or may be a threaded recess that extends a sufficient distance into the gimbal knob to receive a connecting bolt and enable the object to be clamped into place between the clamp mount and the gimbal knob. In at least one embodiment, a threaded hole may be advantageous in certain situations as it can allow for connecting bolts and/or objects of different sizes. Once in position, the gimbal knob can be rotated 608 to cause the threaded connecting bolt to be pulled into the threaded receptacle, drawing the gimbal knob toward the clamp mount. During such movement, the gimbal joint of the gimbal knob can pivot to allow the threaded receptacle and the connecting bolt to properly align so the connecting bolt can be received into the threaded receptacle. The gimbal knob can continue to be rotated 610 until the object is securely clamped between the gimbal knob and the clamp mount. When in position, a clamping surface of the gimbal knob will be positioned against the clamped object, with an axis of rotation being orthogonal to at least the local surface of the object. The connecting bolt will be at an angle with respect to the axis of rotation of the gimbal knob, due in part to the pivoting capability of the gimbal joint.

As mentioned, in some embodiments, a separate clamp mount is not needed. Any object, device, component, or system that includes, or can receive, a connecting bolt can be used with a gimbal knob as long as the bolt is of sufficient length and diameter, with the appropriate threading. In some embodiments, there may be multiple gimbal knobs with different threading to account for different bolt configurations. While a plastic knob with hand turning recesses is illustrated, there may be other knob configurations that can be used as well, which may allow for turning by hand or through an automated mechanism, among other such options. Further, forms other than knobs can be used as well as appropriate, as long as those forms allow for the appropriate rotation or other clamping motion.

Other variations are within spirit of present description. Thus, while the described techniques are susceptible to various modifications and alternative constructions, certain illustrated embodiments thereof are shown in drawings and have been described above in detail. It should be understood, however, that there is no intention to limit description to specific form or forms described, but on contrary, intention is to cover all modifications, alternative constructions, and equivalents falling within spirit and scope of description, as defined in appended claims.

Terms such as "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Use of any and all examples, or exemplary language (e.g., "such as") provided herein, is intended merely to better illuminate embodiments of the description and does not pose a limitation on scope of description unless otherwise claimed. No language in specification should be construed as indicating any non-claimed element as essential to practice of the description.

Although descriptions herein set forth example implementations of described techniques, other architectures may be used to implement described functionality, and are intended to be within scope of this description. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are described as exemplary forms of implementing the claims.

What is claimed is:

1. A clamping assembly, comprising:

a clamp mount including an attachment mechanism to provide secure attachment of the clamp mount to a mounting surface, the clamp mount including a threaded bolt extending in a direction orthogonal to the mounting surface; and a gimbal knob including a turnable knob portion and a knob bottom, the gimbal knob further including a gimbal joint having a threaded receptacle for receiving the threaded bolt of the clamp mount, the gimbal joint including a plurality of ball bearings around a circumference of the gimbal joint that are able to be received by inner recesses of the turnable knob portion in order to allow the gimbal joint to pivot with respect to an axis of rotation of the gimbal knob but prevent independent rotation of the gimbal joint within the gimbal knob, wherein an object to be clamped to the mounting surface is able to have the threaded bolt inserted through an opening in the object that is received by the threaded receptacle of the gimbal knob, the gimbal joint able to pivot to receive the threaded bolt at an angle with respect to the axis of rotation, and wherein the object is able to be clamped to the mounting surface in response to the gimbal knob being rotated in a tightening direction to cause the threaded bolt to be drawn into the threaded receptacle of the gimbal knob, the knob bottom being brought into secure contact with the object in an orientation that is at an angle with respect to the mounting surface.

2. The clamping assembly of claim 1, wherein the threaded receptacle is provided using a metal insert in a gimbal housing, and wherein the metal insert includes one or more external supports for preventing the metal insert from being pulled from the gimbal housing.

3. The clamping assembly of claim 1, wherein the ball bearings are formed from a plastic, polymer, or metal, and wherein the inner recesses of the turnable knob portion are shaped to allow for motion of the ball bearings in at least two directions to allow for pivoting of the gimbal joint over a determined angular range.

4. The clamping assembly of claim 3, wherein the gimbal knob includes upper and lower openings with angled walls allowing for a connecting bolt to be received over the determined angular range.

5. The clamping assembly of claim 1, wherein the turnable knob portion includes a plurality of recesses about a knob circumference shaped to facilitate rotation by a human hand.

6. The clamping assembly of claim 1, wherein the object to be clamped to the mounting surface is a tool to be used to perform a task, the task requiring stable and precise positioning of the tool to be provided by the clamping assembly.

7. The clamping assembly of claim 1, wherein at least one additional clamping assembly is able to be used to clamp the object to the mounting surface, the mounting surface being non-planar, and wherein a second connecting bolt of the additional clamping assembly is at an angle with respect to the connecting bolt of the clamping assembly.

8. The clamping assembly of claim 1, wherein the attachment mechanism of the clamp mount uses at least one of suction, vacuum, magnetics, or adhesive to provide the secure attachment.

9. A gimbal knob, comprising:

a knob housing; and a gimbal joint positioned within a cavity of the knob housing, the gimbal joint able to pivot with respect to an axis of rotation of the gimbal knob to allow a threaded receptacle of the gimbal joint to receive a threaded connecting shaft at an angle with respect to the axis of rotation, wherein the threaded connecting shaft is able to be drawn into the threaded receptacle at the angle during rotation of the gimbal knob, such that an object positioned between the knob housing and a clamp mount, corresponding to the threaded connecting shaft, is able to be clamped in place with respect to an angled mounting surface.

10. The gimbal knob of claim 9, wherein the gimbal joint includes a plurality of ball bearings positioned about a circumference of the gimbal knob and allowing for pivoting over allowable angular range, with respect to the axis of rotation, over a 360 degree range of pivot directions.

11. The gimbal knob of claim 10, wherein the knob housing includes at least one angled opening for receiving the threaded connection shaft over the allowable angular range.

12. The gimbal knob of claim 9, wherein the threaded shaft is positioned with respect to the clamp mount such that the threaded connection shaft is orthogonal to at least a local portion of the angled mounting surface.

13. The gimbal knob of claim 9, wherein the threaded receptacle is provided using a metal insert in a gimbal housing, and wherein the metal insert includes one or more external supports for preventing the metal insert from being pulled from the gimbal housing.

14. The gimbal knob of claim 10, wherein the ball bearings are formed from a plastic, polymer, or metal, and wherein a plurality of inner recesses of the knob housing are shaped to allow for motion of the ball bearings in at least two directions to allow for pivoting of the gimbal joint over a determined angular range.

15. The gimbal knob of claim 9, further comprising a turnable knob portion including a plurality of recesses about a knob circumference shaped to facilitate rotation by a human hand.

16. The gimbal knob of claim 9, wherein the gimbal knob is one of a plurality of gimbal knobs to be used to secure the object to the angled mounting surface, the angled mounting surface being non-planar such that gimbal housings within the plurality of gimbal knobs may receive threaded connecting shafts at different angles.

17. A method, comprising:

receiving a threaded connection bolt, of a clamp mount, to a threaded receptacle of a gimbal knob, the threaded receptacle corresponding to a gimbal joint able to pivot with respect to an axis of rotation of the gimbal knob;

performing an initial rotation of the gimbal knob, along the axis of rotation, in order to cause the gimbal joint to pivot to an angle allowing the threaded connection bolt to begin to be received into the threaded receptacle; and performing additional rotation of the gimbal knob along the axis of rotation to cause the threaded connection bolt to be drawn further into the threaded receptacle, wherein the gimbal knob is brought into contact with an object, positioned between the clamp mount and the gimbal knob, in a direction corresponding to the angle, and wherein a bottom surface of the gimbal knob securely contacts a surface of the object that is non-parallel to a mounting surface to which the clamp mount is attached.

18. The method of claim 17, further comprising:

positioning the object such that the threaded connection bolt passes through an opening in the object before receiving the threaded connection bolt to the threaded receptacle of the gimbal knob.

19. The method of claim 17, wherein the gimbal joint includes a plurality of ball bearings positioned about a circumference of the gimbal knob and allowing for pivoting over allowable angular range, with respect to the axis of rotation, over a 360 degree range of pivot directions.

20. The method of claim 17, further comprising:

using at least one additional gimbal knob to clamp the object to the mounting surface using at least one additional clamp mount, the mounting surface being non-planar such that gimbal housings within the gimbal knobs are able to receive threaded connecting shafts at different angles.

* * * * *